(12) United States Patent
Jeong

(10) Patent No.: US 11,763,838 B2
(45) Date of Patent: Sep. 19, 2023

(54) DEVICE AND METHOD TO RECOGNIZE VOICE

(71) Applicant: HANWHA TECHWIN CO., LTD., Seongnam-si (KR)

(72) Inventor: Kyoungjeon Jeong, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 276 days.

(21) Appl. No.: 17/347,496

(22) Filed: Jun. 14, 2021

(65) Prior Publication Data

US 2021/0358516 A1 Nov. 18, 2021

Related U.S. Application Data

(63) Continuation of application No. PCT/KR2019/018451, filed on Dec. 26, 2019.
(Continued)

(30) Foreign Application Priority Data

Dec. 23, 2019 (KR) .................. 10-2019-0173095

(51) Int. Cl.
*G10L 25/78* (2013.01)
*G10L 15/00* (2013.01)
(Continued)

(52) U.S. Cl.
CPC .............. *G10L 25/78* (2013.01); *G10L 15/00* (2013.01); *H04R 1/406* (2013.01); *H04R 5/04* (2013.01)

(58) Field of Classification Search
CPC ......... G10L 25/78; G10L 15/00; G10L 15/22; G10L 15/28; G10L 15/02;
(Continued)

(56) References Cited

U.S. PATENT DOCUMENTS 9,431,029 B2 8/2016 Yook et al.
2012/0078624 A1* 3/2012 Yook .................. G10L 25/78
704/E17.001
(Continued)

FOREIGN PATENT DOCUMENTS

JP 2011-237621 11/2011
JP 2016-080750 5/2016
(Continued)

OTHER PUBLICATIONS

International Search Report of International Application No. PCT/KR2019/018451 dated Dec. 26, 2019.

*Primary Examiner* — Yogeshkumar Patel
(74) *Attorney, Agent, or Firm* — H.C. Park & Associates, PLC

(57) ABSTRACT

A voice recognition device includes a plurality of mics disposed toward different directions and a processor connected with the plurality of mics, wherein the processor is configured to determine, in a setup mode, a direction of a first sound received through the plurality of mics; set a non-detecting zone, which includes the direction of the first sound; determine, in a normal mode, a direction of a second sound received through the plurality of mics; and skip voice recognition for the second sound or an operation based on the voice recognition depending on whether the direction of the second sound belongs to the non-detecting zone.

15 Claims, 11 Drawing Sheets

Related U.S. Application Data

(60) Provisional application No. 62/785,625, filed on Dec. 27, 2018.

(51) Int. Cl.
*H04R 1/40* (2006.01)
*H04R 5/04* (2006.01)

(58) Field of Classification Search
CPC . G10L 2021/02166; H04R 1/406; H04R 5/04; H04R 3/005; H04R 2201/401; H04R 2430/20
See application file for complete search history.

(56) References Cited

U.S. PATENT DOCUMENTS

| | | | | |
|---|---|---|---|---|
| 2013/0073283 | A1* | 3/2013 | Yamabe | G10L 21/0216 |
| | | | | 704/226 |
| 2016/0064002 | A1* | 3/2016 | Kim | G01S 3/8083 |
| | | | | 704/246 |
| 2017/0243578 | A1* | 8/2017 | Son | G10L 21/0208 |

FOREIGN PATENT DOCUMENTS

| | | |
|---|---|---|
| KR | 10-2010-0098104 | 9/2010 |
| KR | 10-2017-0097519 | 8/2017 |

* cited by examiner

United States Patent US 11,763,838 B2

DEVICE AND METHOD TO RECOGNIZE VOICE

CROSS-REFERENCE TO RELATED APPLICATIONS

This application is a Bypass continuation of International Patent Application No. PCT/KR2019/018451 filed on Dec. 26, 2019, which claims priority from and the benefit of U.S. Provisional Patent Application No. 62/785,625 filed on Dec. 27, 2018 and Korean Patent Application No. 10-2019-0173095 filed on Dec. 23, 2019, each of which is hereby incorporated by reference for all purposes as if fully set forth herein.

BACKGROUND

Field

Embodiments of the invention relate generally to a device and method to recognize voice, and more particularly, to a voice recognition device including microphones (hereinafter also referred to as "mics") and an operation method thereof.

Discussion of the Background

With the development of electronic technologies, various types of electronic devices, for example, a smart phone, a table PC, and an artificial intelligence speaker have been developed and distributed. Users may be supplied with various services, such as email, web surfing, photo shooting, instant message, schedule management, video playback, and audio playback, using such electronic devices.

The electronic device such as a smart phone, a tablet PC and an artificial intelligence speaker may include a voice interface that may conveniently perform a user's desired operation by recognizing the user's voice. The voice interface is widely used as a voice recognition technology that converts a user's voice input through a microphone of the electronic device into an electrical voice signal and then recognizes the converted voice signal as a command or text by analyzing the converted voice signal.

The above information disclosed in this Background section is only for understanding of the background of the inventive concepts, and, therefore, it may contain information that does not constitute prior art.

SUMMARY

Provided is a voice recognition device having a voice recognition function of improved reliability. Also provided is a voice recognition device that may provide a voice recognition function using relatively less resources.

Additional features of the inventive concepts will be set forth in the description which follows, and in part will be apparent from the description, or may be learned by practice of the inventive concepts.

In accordance with an aspect of the disclosure, a voice recognition device includes: a plurality of mics disposed toward different directions; and a processor connected with the plurality of mics, wherein the processor is configured to determine, in a setup mode, a direction of a first sound received through the plurality of mics; set a non-detecting zone, which includes the direction of the first sound; determine, in a normal mode, a direction of a second sound received through the plurality of mics; and skip, in the normal mode, voice recognition for the second sound or an operation based on the voice recognition depending on whether the direction of the second sound belongs to the non-detecting zone.

The processor may be configured to skip the voice recognition for the second sound or the operation based on the voice recognition when the direction of the second sound belongs to the non-detecting zone, and perform the voice recognition for the second sound or the operation based on the voice recognition when the direction of the second sound is from the non-detecting zone.

A range of the non-detecting zone may have a predetermined angle range.

The voice recognition device may further include a storage medium that stores the range of the non-detecting zone.

The processor may enter the setup mode in response to a user input.

The voice recognition device may further include a communicator connected with the processor, wherein the processor is configured to adjust the range of the non-detecting zone in accordance with the user input received through the communicator.

In accordance with another aspect of the disclosure, a voice recognition device includes: a plurality of mics disposed toward different directions; a storage medium configured to store one or more strings; and a processor connected with the plurality of mics and the storage medium, wherein the processor is configured to acquire voice data by performing voice recognition for a first sound received through the plurality of mics; set a non-detecting zone, which includes a direction of the first sound, when the voice data is matched with any one of the strings, the range of the non-detecting zone being determined in accordance with the matched string; determine a direction of a second sound received through the plurality of mics; and skip voice recognition for the second sound or an operation based on the voice recognition depending on whether the direction of the second sound belongs to the non-detecting zone.

The storage medium may further store angle ranges respectively corresponding to the strings, and the processor may be configured to determine an angle range, which corresponds to the matched string, among the angle ranges as a range of the non-detecting zone.

The processor may be configured to skip the voice recognition for the second sound or the operation based on the voice recognition when the direction of the second sound belongs to the non-detecting zone; and perform the voice recognition for the second sound or the operation based on the voice recognition when the direction of the second sound is from the non-detecting zone.

The storage medium may be configured to further store one or more second strings, and the processor may be configured to acquire second voice data by performing voice recognition for a third sound received through the plurality of mics; and disable the non-detecting zone when the second voice data is matched with any one of the second strings.

In accordance with an aspect of the disclosure, a method to recognize a voice using a plurality of mics includes: determining a direction of a first sound received through the plurality of mics, in a setup mode; setting a non-detecting zone that includes the direction of the first sound; determining a direction of a second sound received through the plurality of mics, in a normal mode; and skipping voice recognition for the second sound or an operation based on the voice recognition depending on whether the direction of the second sound belongs to the non-detecting zone.

The skipping may include: skipping the voice recognition for the second sound or the operation based on the voice recognition when the direction of the second sound belongs to the non-detecting zone; and performing the voice recognition for the second sound and the operation based on the voice recognition when the direction of the second sound gets out of the non-detecting zone.

A range of the non-detecting zone may have a predetermined angle range.

The method may further include entering the setup mode in response to a user input.

The setting may include adjusting the range of the non-detecting zone in accordance with the user input transmitted from a user device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EMBODIMENTS

Figure 1:
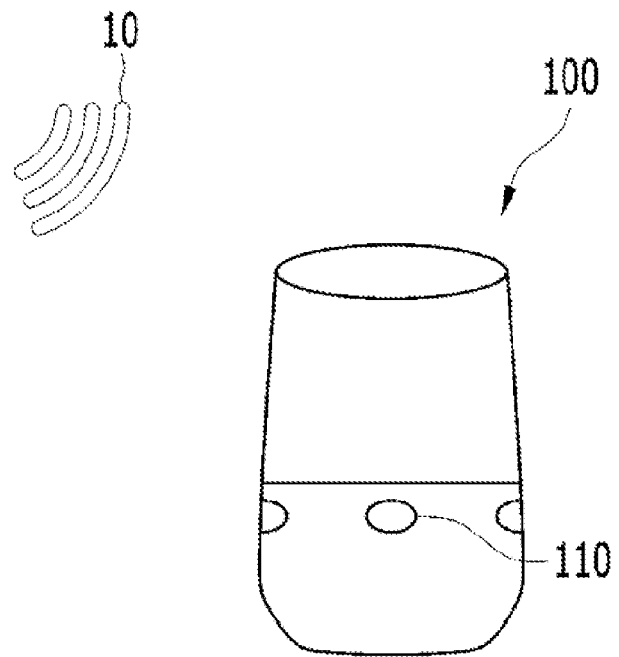
FIG. 1 is a perspective view illustrating a voice recognition device according to the embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the to presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the spirit and scope of the inventive concepts. Further, the blocks, units, and/or modules of some exemplary embodiments may be physically combined into more complex blocks, units, and/or modules without departing from the spirit and scope of the inventive concepts.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
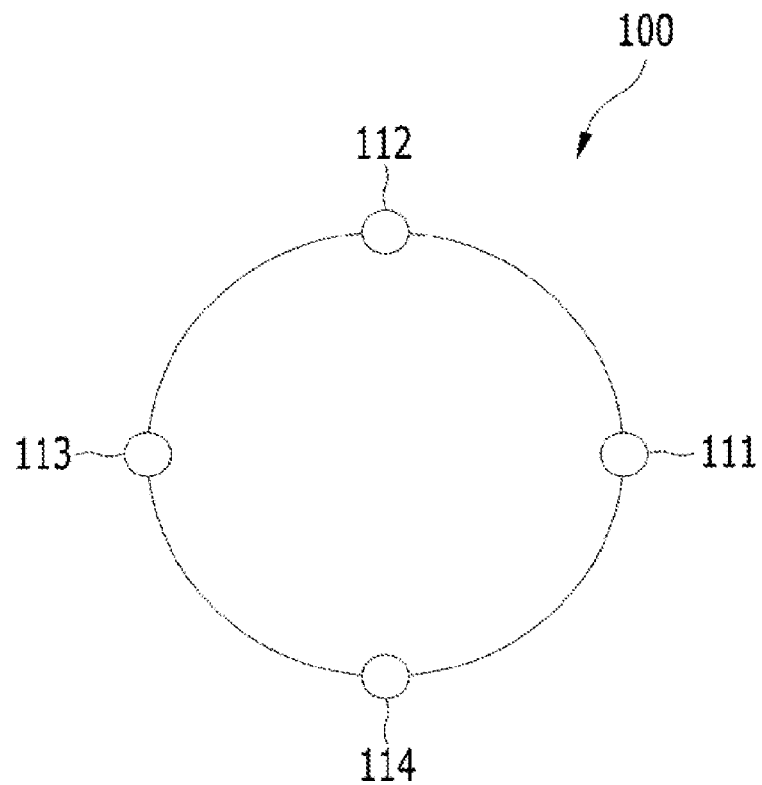
FIG. 2 is a perspective view illustrating the voice recognition device of FIG. 1.

FIG. 1 is a perspective view illustrating a voice recognition device according to the embodiment of the present disclosure, and FIG. 2 is a perspective view illustrating the voice recognition device of FIG. 1.

Referring to FIGS. 1 and 2, a voice recognition device 100 includes a plurality of mics 110 (or microphones). The plurality of mics 110 may be disposed toward different directions. As shown in FIG. 2, the voice recognition device 100 may include first to fourth mics 111 to 114, each of which may be oriented toward different directions, for example, directions of 0°, 90°, 180° and 270°. In the embodiments, each of the first to fourth mics 111 to 114 may be a directional mic directed toward a specific direction, or a non-directional mic. Hereinafter, it is assumed that the voice recognition device 100 includes four mics 111 to 114. However, the embodiments of the present disclosure are not limited to this case, and the number of mics included in the voice recognition device 100 may diversely be modified in accordance with application examples.

The voice recognition device 100 may detect a direction of a sound 10 received through the first to fourth mics 111 to 114. The direction of the sound 10 may be an angle of the sound 10 entering the voice recognition device 100. The voice recognition device 100 may adopt various technologies known in this field to detect a direction of a sound using the mics oriented toward different directions. In an embodiment, the direction of the sound 10 may be determined based on a phase difference of sound signals received in the first to fourth mics 111 to 114. In another embodiment, the direction of the sound 10 may be determined based on a difference and/or ratio in sizes of the sound signals received in the first to fourth mics 111 to 114.

Also, the voice recognition device 100 may acquire voice data by performing voice recognition for the sound 10, and may perform various operations based on the acquired voice data. In the embodiments, the voice recognition device 100 may include artificial intelligence, and may acquire relatively exact voice data by performing voice recognition for the sound 10 using artificial intelligence. In the embodiments, the voice recognition device 100 may be an artificial intelligence speaker or a smart speaker.

Figure 3:
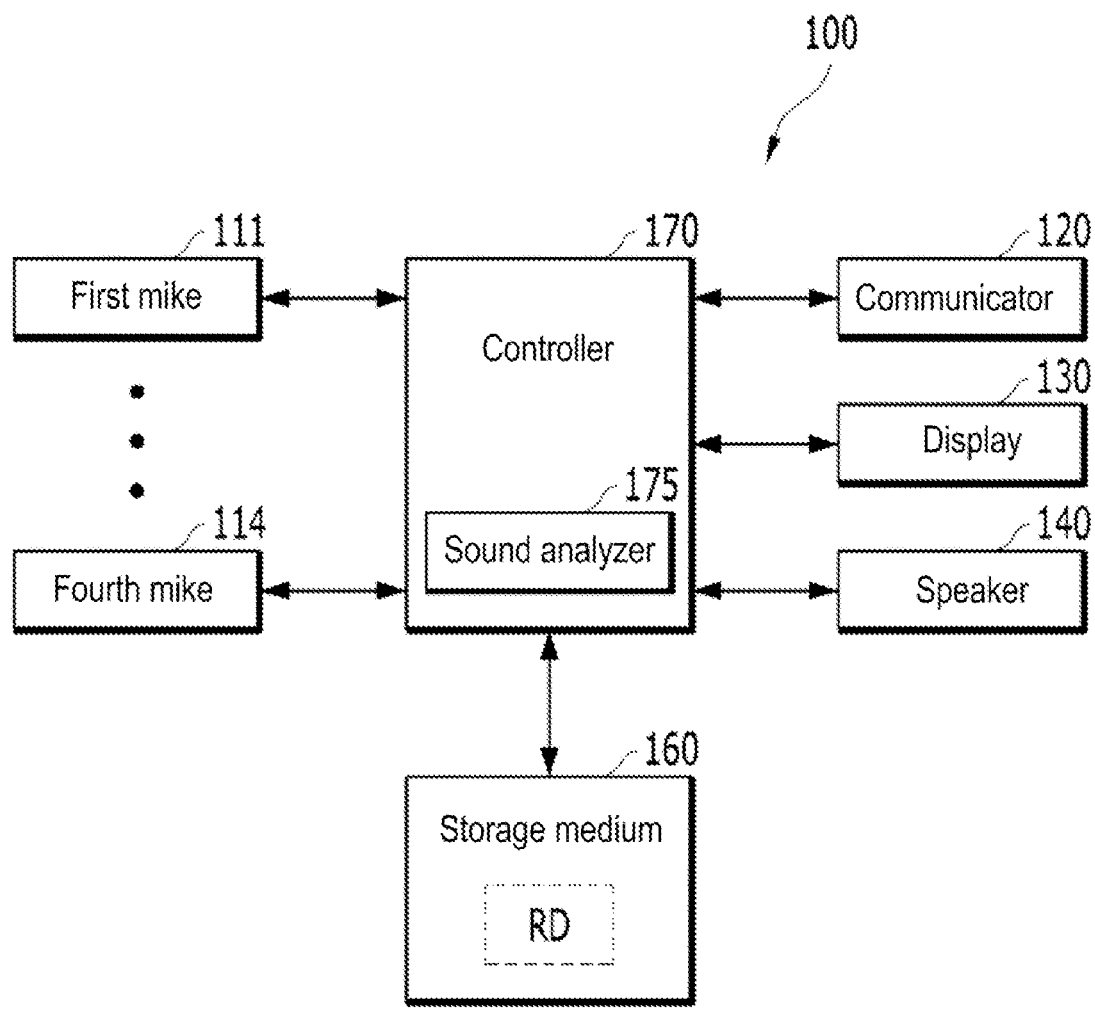
FIG. 3 is a block view illustrating an embodiment of the voice recognition device of FIG. 1.

FIG. 3 is a block view illustrating an embodiment of the voice recognition device of FIG. 1.

Referring to FIG. 3, the voice recognition device 100 may include first to fourth mics 111 to 114, a communicator 120, a display 130, a speaker 140, a storage medium 160, and a controller 170.

The first to fourth mics 111 to 114 may be oriented toward their respective directions different from one another as described with reference to FIGS. 1 and 2. Each of the first to fourth mics 111 to 114 may receive a sound and convert the received sound into an electrical sound signal. Each of the first to fourth mics 111 to 114 may transfer the converted sound signal to the controller 170.

The communicator 120 may perform communication with an external electronic device, for example, a user terminal. The communicator 120 may be connected with a network through various types of communications such as Wi-Fi communication, Bluetooth communication, NFC (near field communication), and cellular communication, thereby performing communication with the external electronic device.

The display 130 may display visualized feedback information corresponding to a sound, for example, a user's voice. In the embodiments, the display 130 may display a graphic interface and/or contents varied depending on a user's voice.

The speaker 140 may output a sound. The speaker 140 may output sound feedback information corresponding to a user's voice.

The storage medium 160 may store data for recognizing a user's voice therein. The storage medium 160 may further store data for providing visualized feedback information on a user's voice and/or sound feedback information. Also, the storage medium 160 may store region data RD indicating a non-detecting zone. In the embodiments, the storage medium 160 may include a nonvolatile storage medium.

The controller 170 may control a whole operation of the voice recognition device 100. The controller 170 may recognize a user's voice by controlling and using each of the first to fourth mics 111 to 114, the communicator 120, the display 130, the speaker 140, and the storage medium 160, and may perform operations based on the recognized result. In the embodiments, the controller 170 may be implemented as a system on chip (SoC) including a central processing unit (CPU), a graphic processing unit (GPU), a memory, etc.

The controller 170 includes a sound analyzer 175. In a setup mode, the sound analyzer 175 may detect a direction of a sound received through the first to fourth mics 111 to 114, and may set a non-detecting zone including the sensed direction. At this time, the sound analyzer 175 may store region data RD indicating the non-detecting zone, in the storage medium 160.

In a normal mode, the sound analyzer 175 may detect a direction of the sound received through the first to fourth mics 111 to 114, and may determine whether the detected direction belongs to the non-detecting zone based on the region data RD. In accordance with the determined result, the sound analyzer 175 may skip voice recognition for the sound. Alternatively, the sound analyzer 175 performs voice recognition for the sound but the controller 170 may skip the operation based on voice recognition. Therefore, the controller 170 may not perform at least one of various operations such as the operation for displaying the visualized feedback information through the display 130 and the operation for outputting the sound feedback information through the speaker 140.

Figure 4:
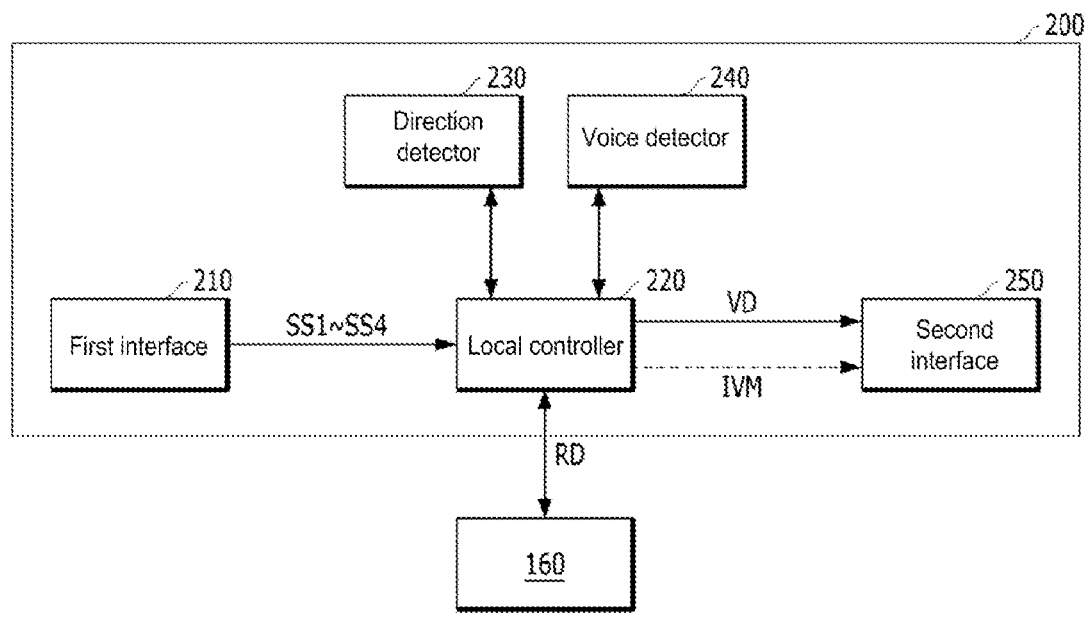
FIG. 4 is a block view illustrating an embodiment of a sound analyzer of FIG. 3.
Figure 5:
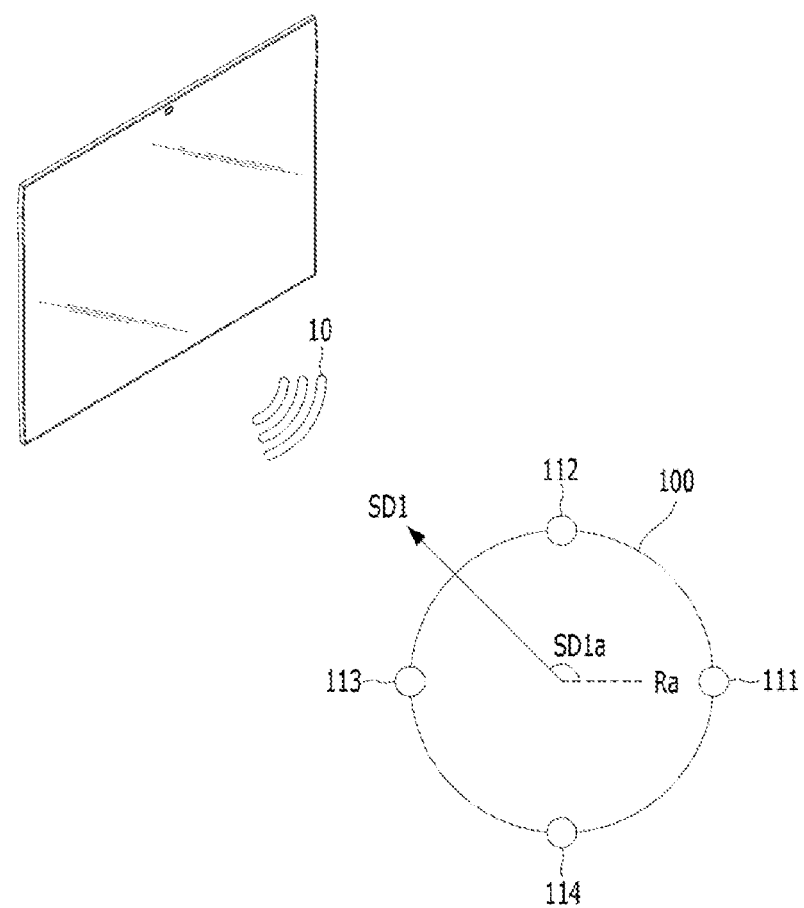
FIGS. 5 and 6 are perspective views illustrating the voice recognition device to describe a method of setting a non-detecting zone in accordance with a sound received through mics in a setup mode.
Figure 6:
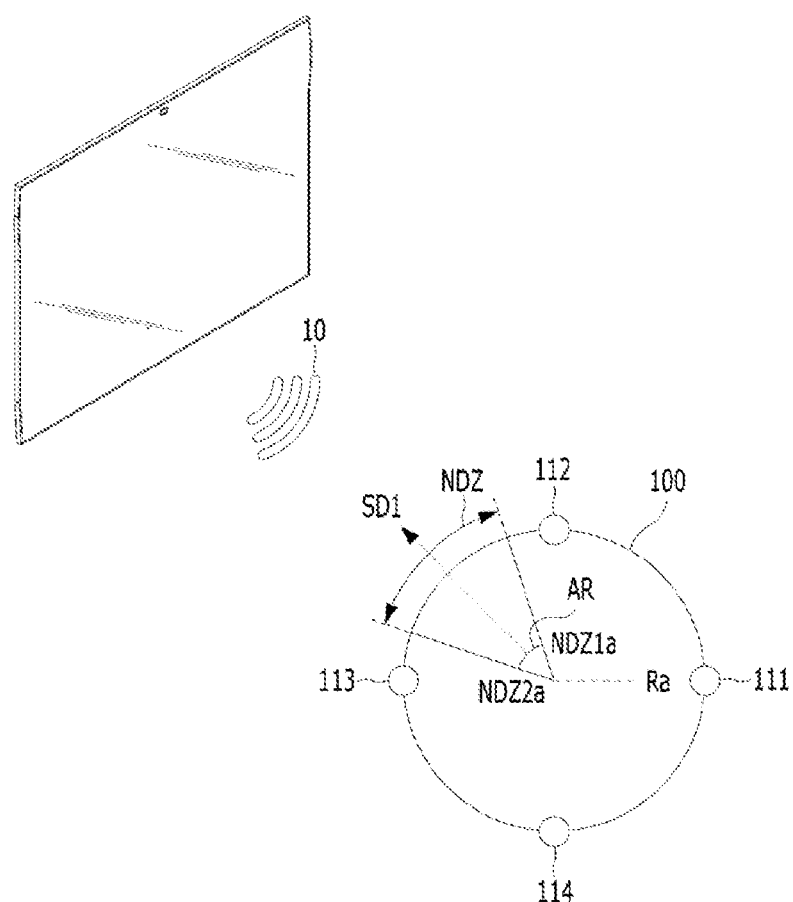
Figure 7:
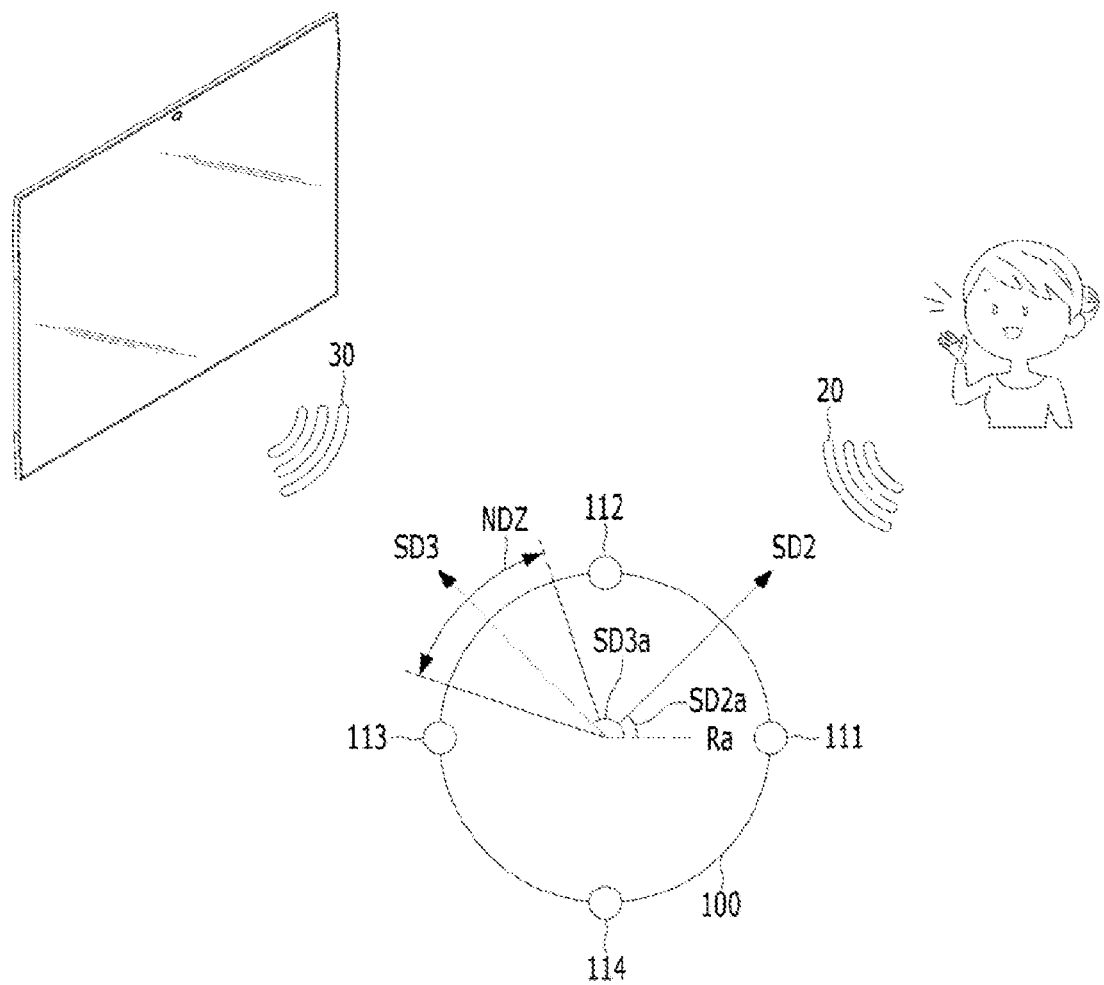
FIG. 7 is a perspective view illustrating the voice recognition device to describe a method of processing a sound received through mics in a normal mode.

FIG. 4 is a block view illustrating an embodiment of the sound analyzer of FIG. 3. FIGS. 5 and 6 are perspective views illustrating the voice recognition device to describe a method of setting a non-detecting zone in accordance with a sound received through mics in a setup mode. FIG. 7 is a perspective view illustrating the voice recognition device to describe a method of processing a sound received through mics in a normal mode. The user may cause the voice recognition device 100 to enter the setup mode based on a voice command, such as "enter setup mode", and the user may cause the voice recognition device 100 to enter the normal mode based on a different voice command, such as "enter normal mode" or "exit setup mode".

Referring to FIG. 4, a sound analyzer 200 may include a first interface 210, a local controller 220, a direction detector 230, a voice detector 240, and a second interface 250.

The first interface 210 may receive first to fourth sound signals SS1 to SS4 from the first to fourth mics 111 to 114 (see FIG. 3), and may provide the received first to fourth sound signals SS1 to SS4 to the local controller 220. The first interface 210 may interface between the first to fourth mics 111 to 114 and the sound analyzer 200. The first interface 210 may be provided as a constituent element of the controller 170.

The local controller 220 may control a whole operation of the sound analyzer 200. The local controller 220 is connected to the first interface 210, the direction detector 230, the voice detector 240 and the second interface 250. The local controller 220 may transmit the first to fourth sound signals SS1 to SS4 received through the first interface 210 to each of the direction detector 230 and the voice detector 240.

The direction detector 230 may detect a direction of a sound based on the first to fourth sound signals SS1 to SS4. The direction detector 230 may adopt various technologies known in this field to detect a direction of a sound. In an embodiment, the direction detector 230 may detect the direction of the sound based on a phase difference of the first to fourth sound signals SS1 to SS4. In another embodiment, the direction detector 230 may detect the direction of the sound based on a difference and/or ratio in sizes of the first to fourth sound signals SS1 to SS4. For example, if sound signal SS1 is picked up at a value of 20 dB by mic 111, sound signal SS2 is picked up at a value of 10 dB by mic 112, sound signal SS3 is picked up at a value of 10 dB by mic 113, and sound signal SS4 is picked up at a value of 2 dB by mic 114, it may be determined that the sound is emanating from a direction that mic 111 is pointing to (that being coming from the right side of voice recognition device 100 in FIG. 2). Alternatively, if sound signal SS1 is picked up at a value of 20 dB by mic 111, sound signal SS2 is picked up at a value of 20 dB by mic 112, sound signal SS3 is picked up at a value of 2 dB by mic 113, and sound signal SS4 is picked up at a value of 2 dB by mic 114, it may be determined that the sound is emanating from a direction between where mic 111 and mic 112 are pointing to (that being coming from the top-right side of voice recognition device 100 in FIG. 2).

Referring to FIG. 5 together with FIG. 4, the sound 10 may be generated in the periphery of the voice recognition device 100. For example, a television may be located in the periphery of the voice recognition device 100, and the television may generate the sound 10. In response to a user's request, the voice recognition device 100 may enter the setup mode. In the setup mode, the local controller 220 may provide the direction detector 230 with the first to fourth sound signals SS1 to SS4 from the first to fourth mics 111 to 114 and control the direction detector 230 to detect a direction SD1 of the sound 10. In the embodiments, the direction detector 230 may provide an angle SD1a based on a reference angle Ra as data (hereinafter, directional data) indicating the direction SD1 of the sound 10. The direction detector 230 transmits the directional data to the local controller 220.

Subsequently, referring to FIG. 6 together with FIG. 4, the local controller 220 may determine a non-detecting zone NDZ in accordance with the directional data. In the embodiments, the non-detecting zone NDZ may have a predetermined angle range AR. The local controller 220 may determine the predetermined angle range AR including the angle SD1a of FIG. 5 as the non-detecting zone NDZ. The local controller 220 may store region data RD indicating the non-detecting zone NDZ, in the storage medium 160. In the embodiments, the local controller 220 may store a first angle NDZ1a and a second angle NDZ2a, which are based on the reference angle Ra, as the region data RD. At this time, the first angle NDZ1a and the second angle NDZ2a may define the non-detecting zone NDZ. In this way, the region data RD may indicate the angle range AR of the non-detecting zone NDZ in the range of 360° (e.g., NDZ is between NDZ1a=310 degrees and NDZ2a=355 degrees). After setting the non-detecting zone NDZ, the voice recognition device 100 may enter the normal mode.

In the embodiments, the local controller 220 may notify an external user terminal of the non-detecting zone NDZ through the communicator 120, and the non-detecting zone NDZ may be adjusted in response to a user input received from the user terminal through the communicator 120. Therefore, the region data RD indicating the adjusted non-detecting zone NDZ may be stored in the storage medium 160.

Referring to FIG. 4 again, the voice detector 240 may generate voice data VD having the same format as that of text by performing voice recognition for at least one of the first to fourth sound signals SS1 to SS4. In the embodiments, the voice detector 240 may include artificial intelligence, and may acquire relatively exact voice data VD by performing voice recognition for the first to fourth sound signals SS1 to SS4 using artificial intelligence.

In the normal mode, the local controller 220 may transmit the first to fourth sound signals SS1 to SS4 received through the first interface 210 to the direction detector 230. As described above, the direction detector 230 may detect the direction of the sound based on the first to fourth sound signals SS1 to SS4. The local controller 220 may also transmit the first to fourth sound signals SS1 to SS4 to the voice detector 240 in accordance to with the detected direction of the sound, and may control the voice detector 240 to perform voice detection for the first to fourth sound signals SS1 to SS4.

Referring to FIG. 7 together with FIG. 4, in the normal mode, a sound 20 may be generated from a zone (hereinafter, detecting zone) that does not correspond to the non-detecting zone NDZ. For example, the sound (or voice) 20 may be received from a person in the periphery of the voice recognition device 100.

The direction detector 230 may detect a direction SD2 of the sound 20 based on the first to fourth sound signals SS1 to SS4 corresponding to the sound 20. For example, the direction detector 230 may determine the angle SD2a as directional data of the sound 20. The direction detector 230 transmits the directional data to the local controller 220.

The local controller 220 may control the voice detector 240 to perform voice recognition depending on whether the direction SD2 of the sound 20 is from the non-detecting zone NDZ. The local controller 220 may identify the non-detecting zone NDZ by referring to the region data RD. When the direction SD2 of the sound 20 belongs to the detecting zone as shown in FIG. 7, the local controller 220 controls the voice detector 240 to perform voice detection.

The voice detector 240 may generate voice data VD by performing voice recognition for at least one of the first to fourth sound signals SS1 to SS4. The local controller 220 may output the voice data VD through the second interface 250. The controller 170 (see FIG. 3) may display visualized feedback information through the display 130 in response to the voice data VD, or may output sound feedback information through the speaker 140.

The sound analyzer 200 and/or the local controller 220 may receive sounds from multi-directions. In this case, as shown in FIG. 7, a sound 30 may be received from a television in the periphery of the voice recognition device 100 in the same manner as the setup mode. The local controller 220 may transmit the first to fourth sound signals SS1 to SS4 corresponding to the sound 30 to the direction detector 230. For example, the local controller 220 may include at least one filter well-known in this field, which detects the first to fourth sound signals SS1 to SS4 corresponding to each of the sounds 20 and 30.

The direction detector 230 may detect a direction SD3 of the sound 30 based on the first to fourth sound signals SS1 to SS4 corresponding to the sound 30. For example, the direction detector 230 may determine an angle SD3a based on the reference angle Ra as directional data of the sound 30. The direction detector 230 transmits the determined directional data to the local controller 220.

The determined direction SD3 of the sound 30 belongs to the non-detecting zone NDZ. In this case, voice detection for the first to fourth sound signals SS1 to SS4 corresponding to the sound 30 may not be performed. The local controller 220 may not transmit the first to fourth sound signals SS1 to SS4 corresponding to the sound 30 to the voice detector 240.

In another embodiment, when the direction SD3 of the sound 30 belongs to the non-detecting zone NDZ, voice detection for the first to fourth sound signals SS1 to SS4 corresponding to the sound 30 may be performed. The local controller 220 may transmit the first to fourth sound signals SS1 to SS4 corresponding to the sound 30 to the voice detector 240, and may receive the voice data VD from the voice detector 240. In this case, the local controller 220 may output an invalid mark IVM together with the voice data VD through the second interface 250. The case that the invalid mark IVM is provided together with the voice data VD may allow the voice recognition device 100 to provide more various functions. For example, in accordance with the invalid mark IVM, the controller 170 (see FIG. 3) may perform any one of various operations such as the operation for displaying visualized feedback information through the display 130 (see FIG. 3) and the operation for outputting sound feedback information through the speaker 140 (see FIG. 3), and may skip the other operations.

In the embodiments, the sound analyzer 200 and/or the local controller 220 may receive sound signals only from limited directions corresponding to the detecting zone. For example, the local controller 220 may include a beam former, and the beam former may form beam only in the detecting zone by referring to the region data RD. For example, the sound analyzer 200 may receive sound signals corresponding to a sound (for example, 20 of FIG. 7) from the detecting zone, and may drop and/or filter sound signals corresponding to a sound (for example, 30 of FIG. 7) from the non-detecting zone NDZ. In this way, voice recognition for the sound from the non-detecting zone NDZ may be skipped. On the other hand, the local controller 220 may transmit the first to fourth sound signals SS1 to SS4 associated with the sound of the detecting zone to the direction detector 230 and the voice detector 240, whereby the local controller 220 may verify whether the direction of the corresponding sound belongs to the detecting zone, and may output the result of voice recognition for the first to fourth sound signals SS1 to SS4 as the voice data VD in accordance with the verified result.

Various sounds may be generated in the periphery of the voice recognition device 100. When voice recognition is performed for all of the sounds and an operation based on voice recognition is performed, unexpected voice recognition may be caused. Such unexpected voice recognition may not be suitable for a user's request or intention. For example, when a television is located in the periphery of the voice recognition device 100 and a voice is generated from the television, the voice recognition device 100 may operate in response to various voices from the television, and this operation may be an error operation.

According to the embodiment of the present disclosure, the voice recognition device 100 sets the non-detecting zone in the setup mode, and then skips voice recognition for the sound belonging to the set non-detecting zone or the operation based on the voice recognition in the normal mode. Therefore, voice recognition for a sound generated from a region unwanted by a user or an operation based on the voice recognition may be avoided. Therefore, an error operation of the voice recognition device 100 may be avoided, and the voice recognition device 100 may have a voice recognition function of improved reliability. Also, resources (for example, power) for processing a sound belonging to the non-detecting zone may be saved, and therefore the voice recognition device 100 may provide a voice recognition function using relatively less resources.

Figure 8:
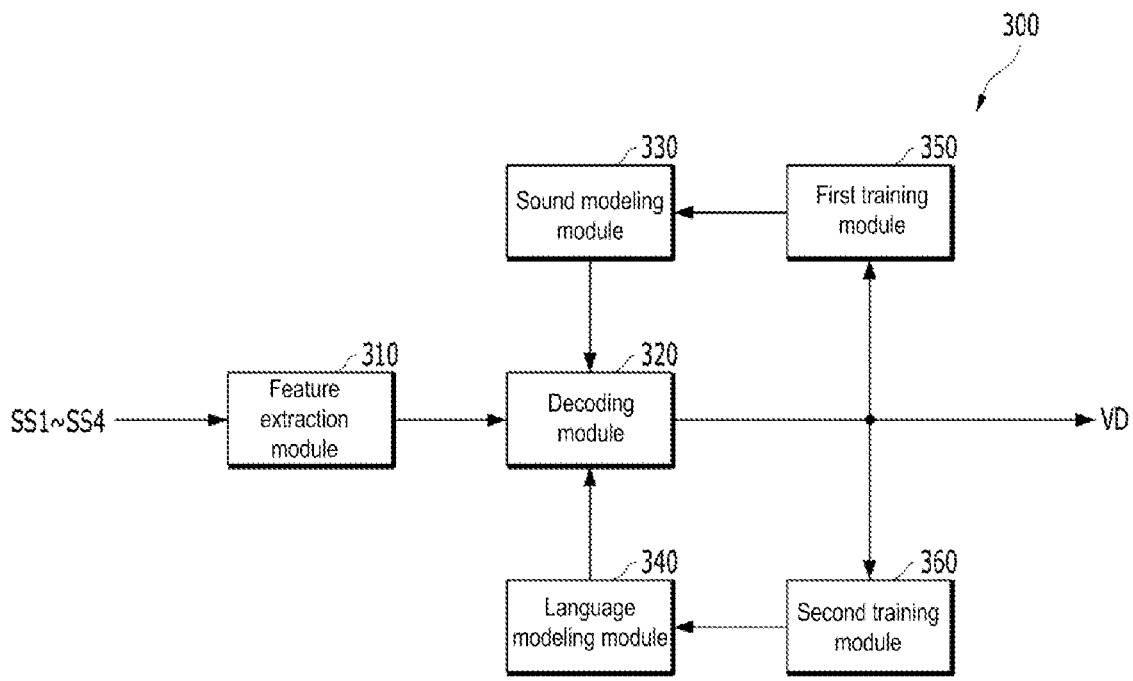
FIG. 8 is a block view illustrating an embodiment of a voice detector of FIG. 4.

FIG. 8 is a block view illustrating an embodiment of the voice detector of FIG. 4.

Referring to FIG. 8, a voice detector 300 may include a feature extraction module 310, a decoding module 320, a sound modeling module 330, a language modeling module 340, a first training module 350, and a second training module 360.

The feature extraction module 310 may extract features of a corresponding voice, for example, formant information, Linear Predictive Coding (LPC) coefficients, total power components, etc. from the first to fourth sound signals SS1 to SS4. The feature extraction module 310 may generate feature information corresponding to the extracted features and provide the decoding module 320 with the generated feature information.

The voice detector 300 may generate and manage one model for each voicing, for example, data trained using an input voice, based on the feature information. For example, the voice detector 300 may generate a model in a probability statistical manner. In the embodiments, the voice detector 300 may extract feature information on input voicing by analyzing the input voicing and then compare the extracted feature information with already made feature information of each voicing to output a recognition result for the most approximate voicing as voice data VD. To this end, the voice detector 300 may include a modeling module and a training module. For example, the voice detector 300 may include a sound modeling module 330 generating a probability model of a short sound unit through training in the first training module 350, and a language modeling module 340 generating a language probability model through training in the second training module 360. The voice detector 300 may be designed in various manners to enhance a voice recognition rate.

The decoding module 320 may generate voice data VD by decoding the feature information output from the feature extraction module 310, and may provide the generated voice data VD to the first and second training modules 350 and 360. The decoding module 320 may compare the models acquired from the sound modeling module 330 and the language modeling module 340 with the feature information provided from the feature extraction module 310, and may output voicing of the highest probability as the voice data VD.

The first and second training modules 350 and 360 may perform training for each model based on the sound signals SS1 to SS4 and the voice data VD. Data required for sound modeling and language modeling and trained models may be stored in an external electronic device, for example, a database of a server, through the communicator 120, and may repeatedly be updated.

Figure 9:
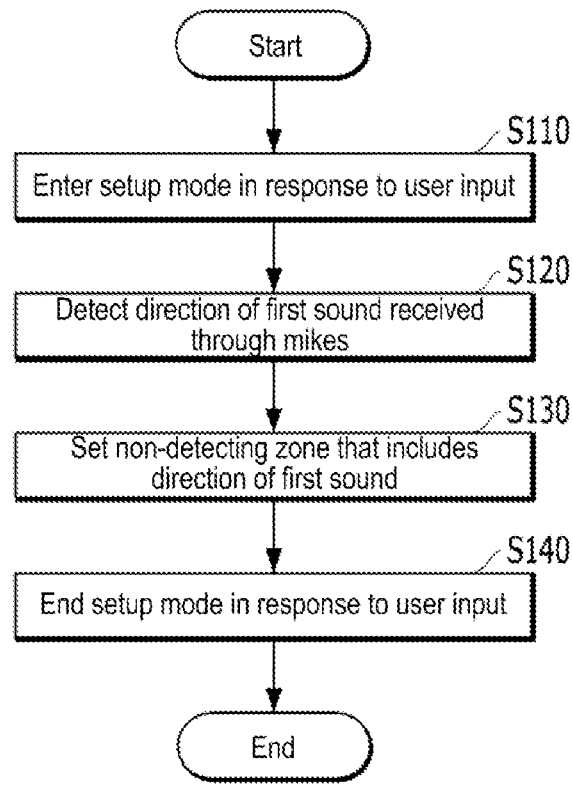
FIG. 9 is a flow chart illustrating a method of setting a non-detecting zone in a setup mode according to the embodiment of the present disclosure.

FIG. 9 is a flow chart illustrating a method of setting a non-detecting zone in a setup mode according to the embodiment of the present disclosure.

Referring to FIGS. 3 and 9, in step S110, the voice recognition device 100 enters the setup mode in response to a user input. The voice recognition device 100 may perform communication with an external user terminal through the communicator 120, and may receive a user input from the user terminal.

In step S120, the voice recognition device 100 detects a direction of a first sound received through the mics 111 to 114. Each of the mics 111 to 114 may generate a sound signal in accordance with the first sound, and the direction of the first sound may be detected based on the generated sound signals.

In step S130, the voice recognition device 100 sets the non-detecting zone including the direction of the first sound. The voice recognition device 100 may set a predetermined angle range, which includes the direction of the first sound, as the non-detecting zone. The voice recognition device 100 may store region data RD indicating the non-detecting zone, in the storage medium 160.

In step S140, the setup mode ends in response to the user input.

Figure 10:
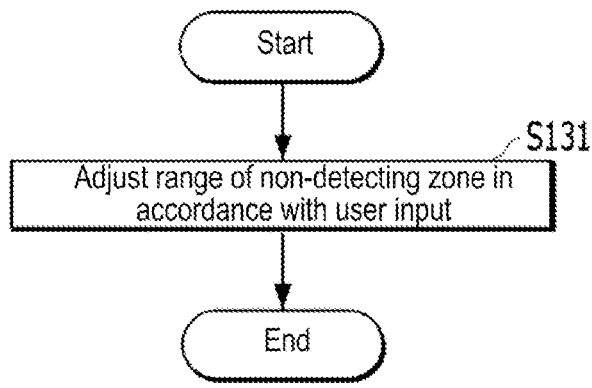
FIG. 10 is a flow chart illustrating an embodiment of step S130 of FIG. 9.

FIG. 10 is a flow chart illustrating an embodiment of the step S130 of FIG. 9.

Referring to FIGS. 3 and 10, in step S131, a range of the non-detecting zone is adjusted in accordance with the user input. For example, the user terminal may display a range of 360° based on the voice recognition device 100 and a graphic interface indicating a range of the non-detecting zone in the range of 360°, and a user may adjust the range of the non-detecting zone through the user terminal. The user terminal may provide the voice recognition device 100 with the user input indicating the adjusted range of the non-detecting zone. The voice recognition device 100 will adjust the non-detecting zone in accordance with the user input.

Figure 11:
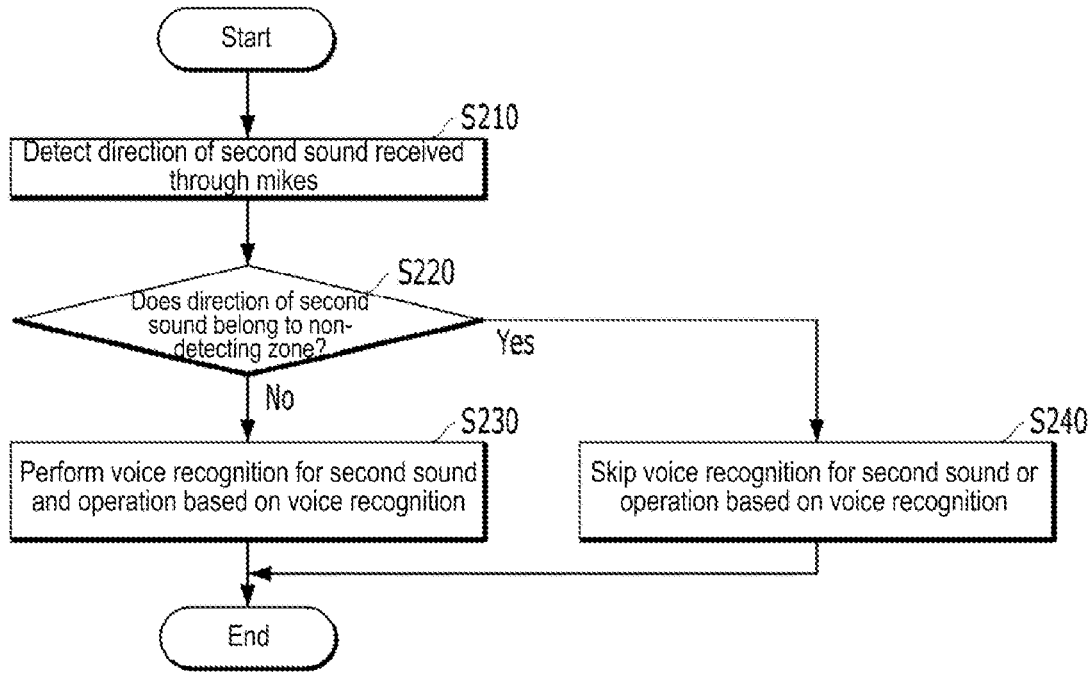
FIG. 11 is a flow chart illustrating a method of processing sounds received through mics in a normal mode according to the embodiment of the present disclosure.

FIG. 11 is a flow chart illustrating a method of processing a sound received through mics in the normal mode according to the embodiment of the present disclosure.

Referring to FIGS. 3 and 11, in step S210, the voice recognition device 100 detects a direction of a second sound received through the mics 111 to 114.

In step S220, it is determined whether the direction of the second sound corresponds to the non-detecting zone. If not so, step S230 is performed. If so, step S240 is performed.

In step S230, voice recognition based on the second sound and an operation based on the voice recognition are performed. The voice recognition device 100 may perform various operations such as an operation for displaying visualized feedback information through the display 130 and an operation for outputting sound feedback information through the speaker 140 in accordance with the result of voice recognition.

In step S230, the voice recognition for the second sound or the operation based on the voice recognition is skipped.

According to the embodiment of the present disclosure, the non-detecting zone set in the setup mode, and then voice recognition for the sound belonging to the set non-detecting zone or the operation based on the voice recognition is skipped in the normal mode. Therefore, voice recognition for a sound generated in a region unwanted by a user or an operation based on the voice recognition may be avoided.

Therefore, an error operation may be avoided, and a voice recognition function of improved reliability may be provided. Also, resources for processing the sound belonging to the non-detecting zone may be saved, and therefore the voice recognition function may be provided by relatively less resources.

Figure 12:
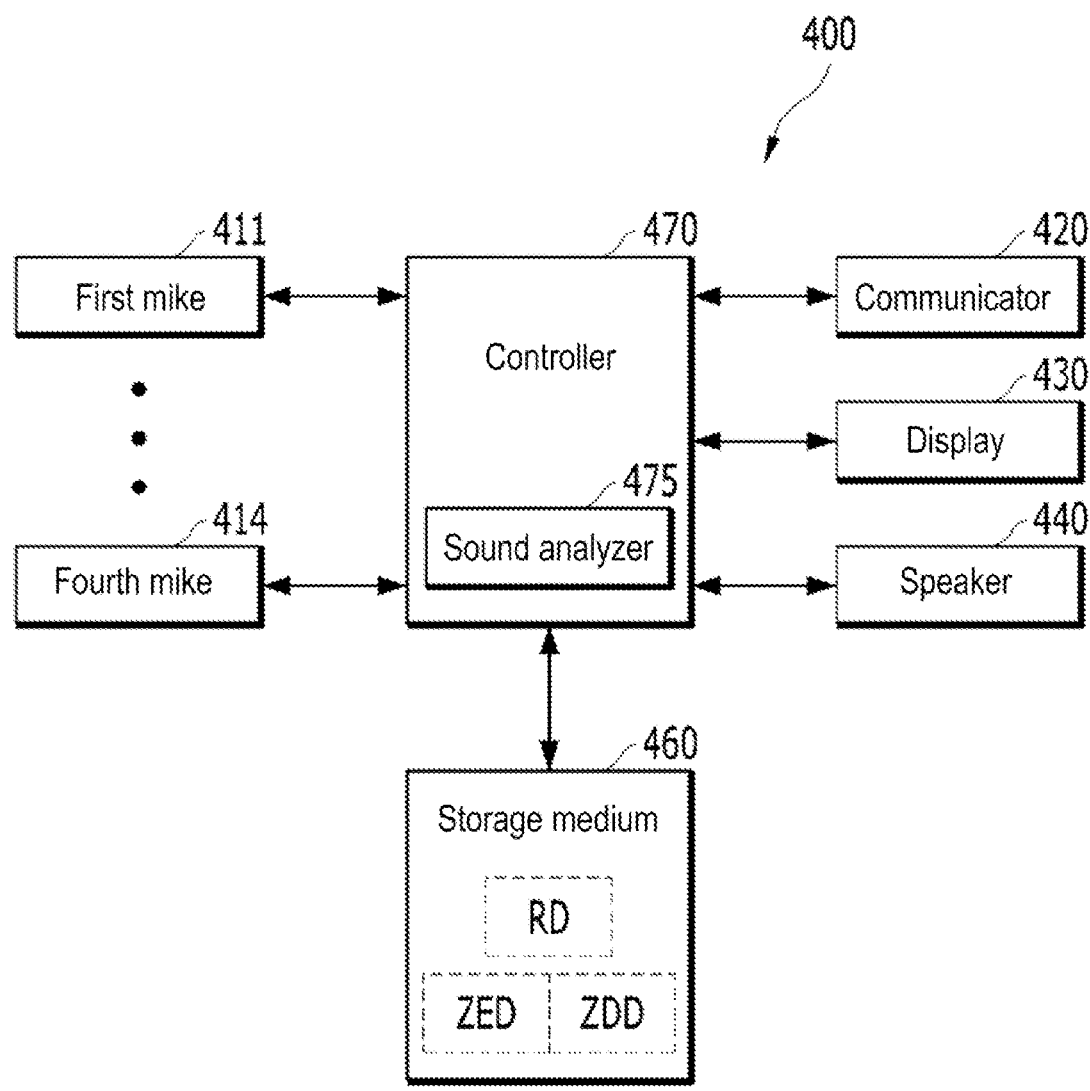
FIG. 12 is a block view illustrating another embodiment of the voice recognition device of FIG. 1.

FIG. 12 is a block view illustrating another embodiment of the voice recognition device of FIG. 1.

Referring to FIG. 12, a voice recognition device 400 may include first to fourth mics 411 to 414, a communicator 420, a display 430, a speaker 440, a storage medium 460, and a controller 470.

The first to fourth mics 411 to 414, the communicator 420, the display 430, the speaker 440 and the storage medium 460 are configured in the same manner as the first to fourth mics 111 to 114, the communicator 120, the display 130, the speaker 140 and the storage medium 160, which are described with reference to FIG. 3.

The controller 470 may control a whole operation of the voice recognition device 400. The controller 470 may include a sound analyzer 475. The sound analyzer 475 is different from the controller 170 of FIG. 3 in that it sets the non-detecting zone based on zone enable data ZED stored in the storage medium 460 and disables the non-detecting zone based on zone disable data ZDD. The sound analyzer 475 may store region data RD indicating the non-detecting zone, in the storage medium 460.

Figure 13:
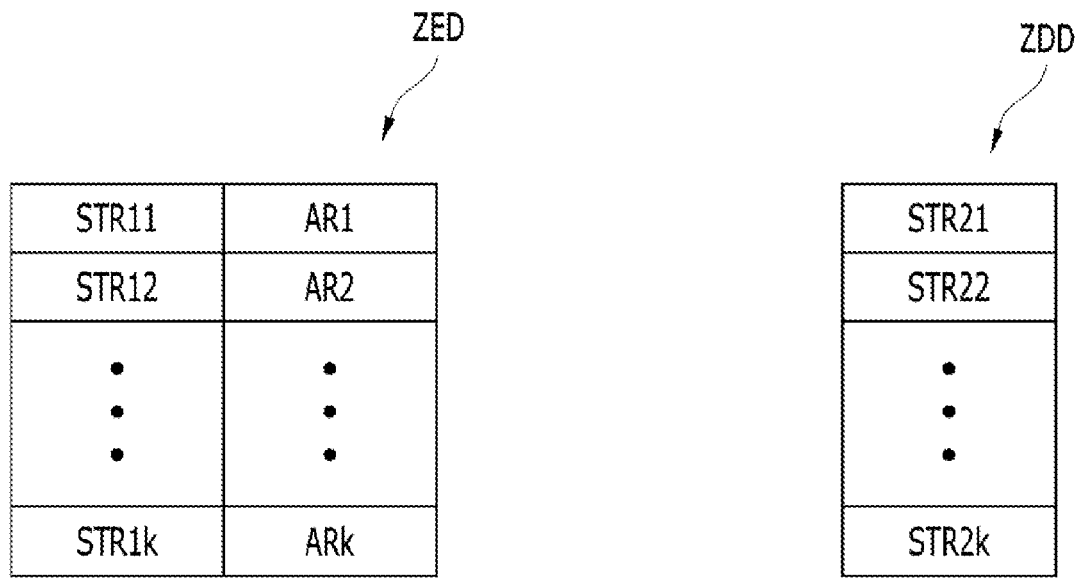
FIG. 13 is a table conceptually illustrating an embodiment of zone enable data and zone disable data of FIG. 12.

FIG. 13 is a table conceptually illustrating an embodiment of the zone enable data and the zone disable data of FIG. 12.

Referring to FIG. 13, the zone enable data ZED may include one or more first strings STR11 to STR1$k$, and angle ranges AR1 to ARk respectively corresponding to the strings STR11 to STR1$k$. In the embodiments, the angle ranges AR1 to ARk of the first strings STR11 to STR1$k$ may be set by a user. For example, the user may set the angle range to a relatively great range when the first string is "I will eat", whereas the user may set the angle range to a relatively small range when the first string is "I will answer the phone". In this way, the range of the non-detecting zone may be varied adaptively to the strings. Continuing with this example, a reason why the user may want a relatively large range (e.g., a first range set to 200 degrees to 350 degrees, or a second range set to 3 degrees to 115 degrees) for the non-detecting zone when on the phone is because the user may be speaking with another person on the phone and saying something such as "Joan left her house and turned off the lights", whereby the user does not want that phrase to be picked up by the voice recognition device 400, which might inadvertently cause the lights to be turned off in the user's home when the user did not intend for that action to be taken (in the case where the user's home is a smart home in which the voice recognition device 400 is configured to detect commands that cause certain actions to be taken with respect to the home, such as turning on or off lights in various parts of the home, opening or closing a garage door, etc. In contrast to this, when the user begins to eat a meal in his/her home, wherever that may be, the user may want to be able to issue voice commands to be picked up by the voice recognition device 400 at all of those places in the home (e.g., "turn on the lights in the dining room"), and thus a relatively small range (e.g., a first range set to 0 degrees to 45 degrees, or a second range set to 110 degrees to 140 degrees) for the non-detecting zone may be desired. When there is no user set value to an angle range for a particular string, the angle range may have a default value (e.g., 45 degrees to 90 degrees).

In an embodiment, the voice recognition device 400 (see FIG. 12) may receive the first strings STR11 to STR1$k$ and the angle ranges AR1 to ARk from an external user terminal through the communicator 420 (see FIG. 12) and store them in the storage medium 460. In another embodiment, the voice recognition device 400 may receive the first strings STR11 to STR1$k$ and the angle ranges AR1 to ARk through a user interface such as a touchpad or voice recognition using the first to fourth mics 411 to 414. Therefore, the user may set his/her desired string and angle range associated with the non-detecting zone. In an embodiment, the voice recognition device 400 (see FIG. 12) may receive the first strings STR11 to STR1$k$ and the angle ranges AR1 to ARk from an external user terminal through the communicator 420 (see FIG. 12) and store them in the storage medium 460. In another embodiment, the voice recognition device 400 may receive the first strings STR11 to STR1$k$ and the angle ranges AR1 to ARk through a user interface such as a touchpad or voice recognition using the first to fourth mics 411 to 414. Therefore, the user may set his/her desired string and angle range associated with the non-detecting zone.

The first strings STR11 to STR1$k$ may be set by the user in a setup mode as being typical phrases spoken by the user, such as string STR11 corresponding to "set first non-detecting zone", string STR12 correspond to "set second non-detecting zone", the third string STR13 corresponding to "I am eating", the fourth string STR14 corresponding to "I am on the phone", etc. When the voice recognition device 400 captures voice that matches or substantially matches a phrase corresponding to one of the strings STR11 to STR1$k$, an appropriate range AR1 to ARk for the non-detecting zone is accordingly set.

The zone disable data ZDD may include one or more second strings STR21 to STR2$k$. In the embodiments, the second strings STR21 to STR2$k$ may be set by a user in the same manner as the first strings in the setup mode. For example, the user may set the second string STR21 to "done eating" or "finished with the phone", the user may set the second string STR22 to "cancel setting of first non-detecting zone", etc.

Figure 14:
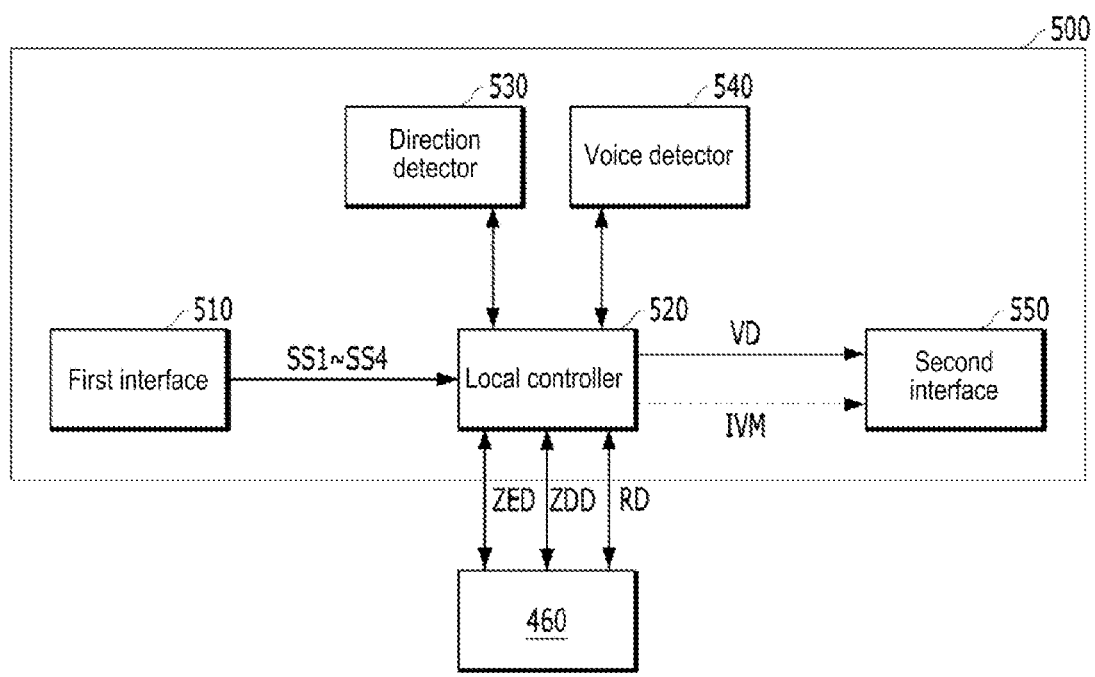
FIG. 14 is a block view illustrating an embodiment of a sound analyzer of FIG. 12.

FIG. 14 is a block view illustrating an embodiment of the sound analyzer of FIG. 12.

Referring to FIG. 14, a sound analyzer 500 may include a first interface 510, a local controller 520, a direction detector 530, a voice detector 540, and a second interface 550.

The first interface 510, the direction detector 530, the voice detector 540 and the second interface 550 are configured in the same manner as the first interface 210, the direction detector 230, the voice detector 240 and the second interface 250, which are described with reference to FIG. 4. Hereinafter, a repeated description will be omitted.

The local controller 520 may transmit the first to fourth sound signals SS1 to SS4 to each of the direction detector 530 and the voice detector 540 when the first to fourth sound signals SS1 to SS4 are received through the first interface 510. A direction of a corresponding sound will be detected by the direction detector 530. Voice data VD of a corresponding sound will be acquired by the voice detector 540.

The local controller 520 determines whether the acquired voice data VD is matched with (or substantially matched with) any one of the first strings STR11 to STR1$k$ (see FIG. 13) of the zone enable data ZED. If so, the local controller 520 may set a range, which includes a direction of a corresponding sound, to the non-detecting zone. At this time, the range of the non-detecting zone may be determined as an angle range, which corresponds to the matched first string, among the angle ranges AR1 to ARk (see FIG. 13). For example, when the voice data is matched with the first string STR11, the angle range (see AR of FIG. 6) of the non-detecting zone (see NDZ of FIG. 6) may be set to the angle range AR1. In the embodiments, the non-detecting zone may be set in the normal mode, as well as in the setup mode.

The local controller 520 may store region data RD indicating the non-detecting zone, in the storage medium 460.

Afterwards, when a sound is received through the mics 411 to 414, the local controller 520 may skip an operation based on voice recognition for the corresponding sound depending on whether the direction of the corresponding sound belongs to the non-detecting zone. In an embodiment, the local controller 520 may not output the voice data VD acquired by the voice detector 540. In another embodiment, the local controller 520 may output an invalid mark IVM together with the voice data VD through the second interface 550. At this time, the invalid mark IVM may cause skip of at least one of various operations such as an operation for displaying visualized feedback information through the display 430 (see FIG. 12) and an operation for outputting sound feedback information through the speaker 440 (see FIG. 12).

Also, the voice data VD may be matched with any one of the second strings STR21 to STR2k of the zone disable data ZDD. In this case, the local controller 520 may disable the non-detecting zone that is previously set. For example, the non-detecting zone may be disabled in the normal mode in the same manner as setup of the non-detecting zone in the setup mode.

Therefore, the user may command the voice recognition device 400 through a voice to set or disable the non-detecting zone. Therefore, user convenience for setup of the non-detecting zone may be improved. Since the user may set the string for the non-detecting zone depending on what he/her wants, the voice recognition device 400 may provide setup of a user friendly non-detecting zone.

Also, an error operation of the voice recognition device 400 for a sound generated in a region unwanted by a user may be avoided due to setup of the non-detecting zone, and since the range of the non-detecting zone may be adjusted per string, the error operation of the voice recognition device 400 may be avoided more effectively. Therefore, the voice recognition device 400 may have a voice recognition function of improved reliability.

Moreover, resources (for example, power) for processing a sound belonging to the non-detecting zone may be saved, and therefore the voice recognition device 400 may provide a voice recognition function using relatively less resources.

Figure 15:
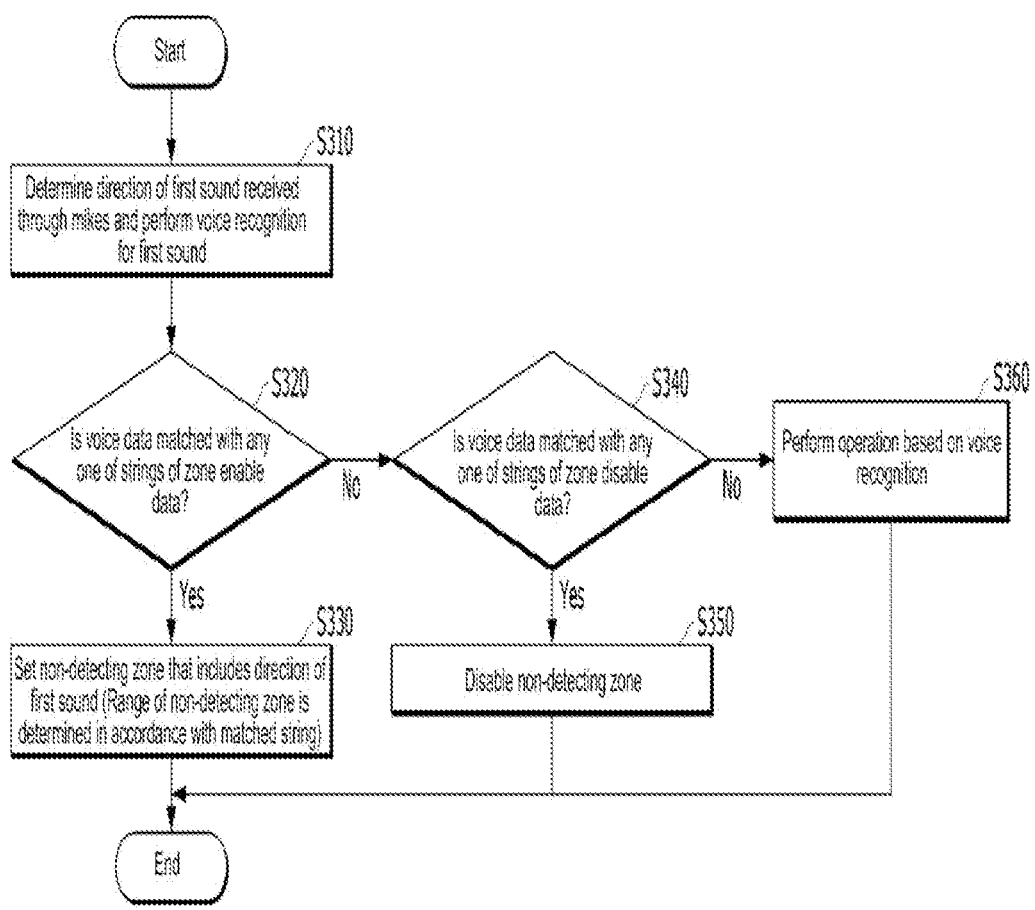
FIG. 15 is a flow chart illustrating a method of setting and disabling a non-detecting zone according to the embodiment of the present disclosure.

FIG. 15 is a flow chart illustrating a method of setting and disabling a non-detecting zone according to the embodiment of the present disclosure.

Referring to FIGS. 12 and 15, in step S310, the voice recognition device 400 determines the direction of the first sound received through the mics 111 to 114, and acquires voice data by performing voice recognition for the first sound.

In step S320, the voice recognition device 400 determines whether the voice data is matched with any one of the strings of the zone enable data ZED. If so, step S330 is performed. If not so, step S340 is performed.

In step S330, the voice recognition device 400 sets the non-detecting zone that includes the direction of the first sound. At this time, the range of the non-detecting zone may be determined in accordance with the matched string. The zone enable data ZED may include strings and angle ranges respectively corresponding to the strings, and the range of the non-detecting zone may be determined in accordance with the angle range corresponding to the matched string.

In step S340, the voice recognition device 400 determines whether the voice data is matched with any one of the strings of the zone disable data ZDD. If so, step S350 is performed. If not so, step S360 is performed.

In step S350, the voice recognition device 400 disables the non-detecting zone.

In step S360, the voice recognition device 400 performs an operation based on the voice data. The voice recognition device 100 may perform the steps S210 to S240 described with reference to FIG. 11.

According to the embodiment of the present disclosure, the user may command the voice recognition device 400 through a voice to set or disable the non-detecting zone. Therefore, user convenience for setup of the non-detecting zone may be improved. Since the user may set the string for the non-detecting zone depending on what he/her wants, setup of a user friendly non-detecting zone may be provided.

Also, the error operation of the voice recognition device 400 for the sound generated in the region unwanted by the user may be avoided due to setup of the non-detecting zone, and since the range of the non-detecting zone may be adjusted per string, the error operation of the voice recognition device 400 may be avoided more effectively. Therefore, a voice recognition function of improved reliability may be provided.

Moreover, resources for processing a sound belonging to the non-detecting zone may be saved, and therefore the voice recognition function may be provided using relatively less resources.

Figure 16:
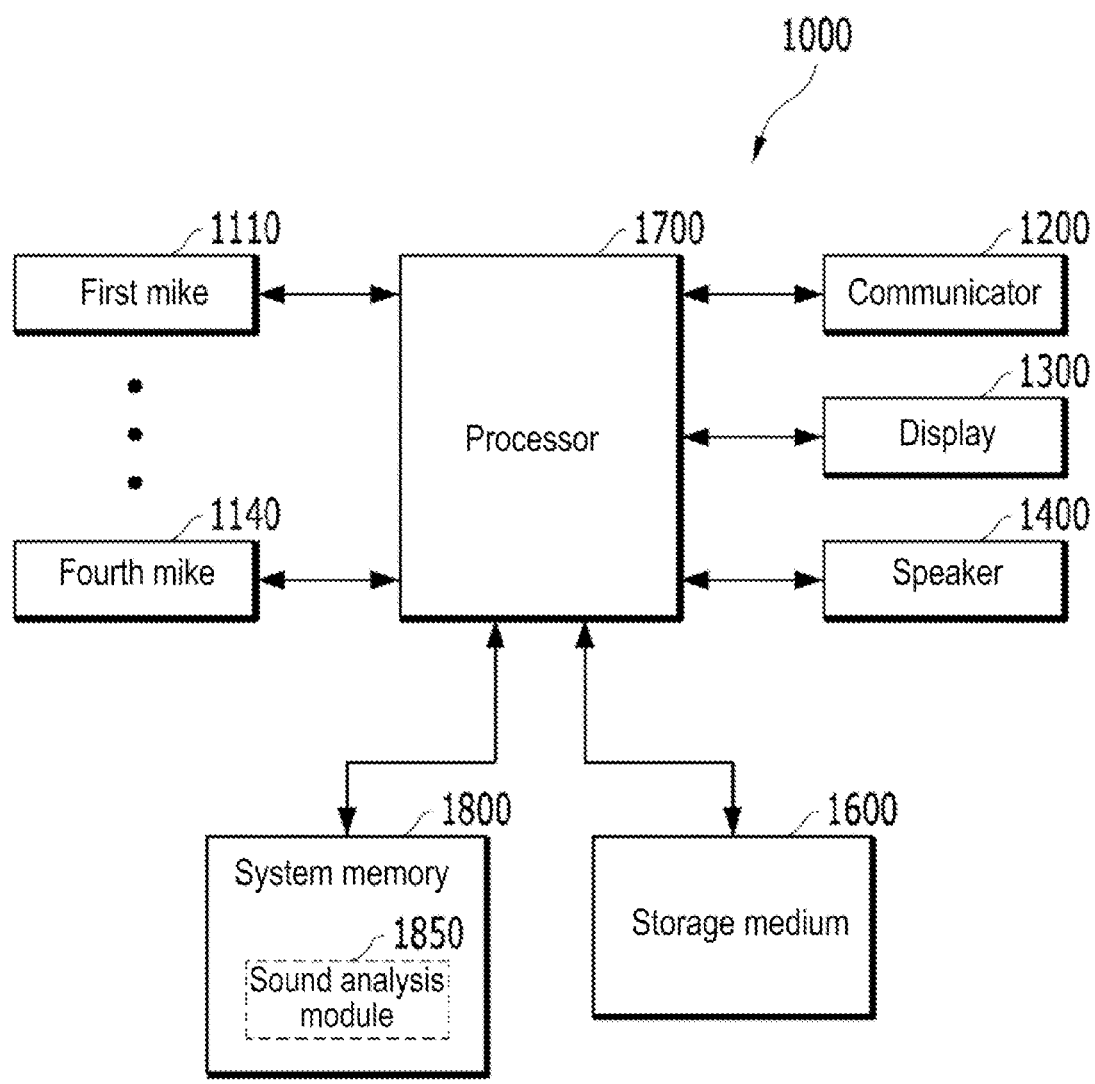
FIG. 16 is a block view illustrating an embodiment of a computer device for implementing the voice recognition device of FIG. 1.

FIG. 16 is a block view illustrating an embodiment of a computer device for implementing the voice recognition device of FIG. 1.

Referring to FIG. 16, a computer device 1000 may include first to fourth mics 1110 to 1140, a communicator 1200, a display 1300, a speaker 1400, a storage medium 1600, a processor 1700, and a system memory 1800. The first to fourth mics 1110 to 1140, the communicator 1200, the display 1300, the speaker 1400 and the storage medium 1600 are configured in the same manner as the first to fourth mics 111 to 114, the communicator 120, the display 130, the speaker 140 and the storage medium 160, which are described with reference to FIG. 3. Hereinafter, a repeated description will be omitted.

The system memory 1800 may include at least one of storage media that may be readable by a computer such as a Random Access Memory (RAM), a Read Only Memory (ROM), etc. The system memory 1800 may serve as a working memory of the processor 1700. The system memory 1800 may serve as a buffer memory of the computer device 1000. In the embodiments, the system memory 1800 may be categorized into a plurality of memories. In the embodiments, at least a portion of the system memory 1800 may be provided as an element included in the processor 1700.

The processor 1700 is configured to control whole operations of the computer device 1000 and a flow of signals among elements of the computer device 1000, and to process data. The processor 1700 may load program codes from the storage medium 1600 to the system memory 1800, and may execute the loaded program codes.

The processor 1700 may load a sound analysis module 1850, which performs the operations of the sound analyzers 175 and 475 described with reference to FIG. 3 and/or FIG. 12 when being executed by the processor 1700, from the storage medium 1600 to the system memory 1800, and may execute the loaded sound analysis module 1850. For example, when the sound analysis module 1850 is executed by the processor 1700, the sound analysis module 1850 may include program codes for performing the functions of the first interfaces 210 and 510, the local controllers 220 and 520, the direction detectors 230 and 530, the voice detectors 240 and 540 and the second interfaces 250 and 550 in FIG. 4 and/or FIG. 14. The processor 1700 may also load an operating system from the storage medium 1600 to the system memory 1800, and may execute the loaded operating system. In this case, the operating system may provide an interface that allows the sound analysis module 1850 to use the elements of the computer device 1000.

According to the embodiments of the present disclosure, a voice recognition device having a voice recognition function of improved reliability is provided. Also, according to the embodiments of the present disclosure, a voice recognition device that may provide a voice recognition function using relatively less resources is provided.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A voice recognition device comprising:
 a plurality of mics disposed toward different directions from a center point of the voice recognition device; and
 a processor connected with the plurality of mics,
 wherein the processor is configured to:
  determine, in a setup mode, a direction of a first sound received through the plurality of mics;
  set a non-detecting zone, which includes the direction of the first sound;
  determine, in a normal mode, a direction of a second sound received through the plurality of mics; and
  skip, in the normal mode, voice recognition for the second sound or an operation based on the voice recognition depending on whether the direction of the second sound belongs to the non-detecting zone.

2. The voice recognition device of claim 1, wherein the processor is configured to skip the voice recognition for the second sound or the operation based on the voice recognition when the direction of the second sound belongs to the non-detecting zone, and perform the voice recognition for the second sound or the operation based on the voice recognition when the direction of the second sound is from the non-detecting zone.

3. The voice recognition device of claim 1, wherein a range of the non-detecting zone has a predetermined angle range.

4. The voice recognition device of claim 1, further comprising a storage medium that stores a range of the non-detecting zone.

5. The voice recognition device of claim 1, wherein the processor enters the setup mode in response to a user input.

6. The voice recognition device of claim 1, further comprising a communicator connected with the processor, wherein the processor is configured to adjust a range of the non-detecting zone in accordance with a user input received through the communicator.

7. A voice recognition device comprising:
 a plurality of mics disposed toward different directions;
 a storage medium configured to store one or more strings; and
 a processor connected with the plurality of mics and the storage medium,
 wherein the processor is configured to:
  acquire voice data by performing voice recognition for a first sound received through the plurality of mics;
  set a non-detecting zone, which includes a direction of the first sound, when the voice data is matched with any one of the strings, a range of the non-detecting zone being determined in accordance with the matched string;
  determine a direction of a second sound received through the plurality of mics; and
  skip voice recognition for the second sound or an operation based on the voice recognition depending on whether the direction of the second sound belongs to the non-detecting zone.

8. The voice recognition device of claim 7, wherein the storage medium further stores angle ranges respectively corresponding to the strings, and the processor is configured to determine an angle range, which corresponds to the matched string, among the angle ranges as a range of the non-detecting zone.

9. The voice recognition device of claim 7, wherein the processor is configured to skip the voice recognition for the second sound or the operation based on the voice recognition when the direction of the second sound belongs to the non-detecting zone; and perform the voice recognition for the second sound or the operation based on the voice recognition when the direction of the second sound is from the non-detecting zone.

10. The voice recognition device of claim 7, wherein the storage medium is configured to further store one or more second strings, and the processor is configured to acquire second voice data by performing voice recognition for a third sound received through the plurality of mics; and disable the non-detecting zone when the second voice data is matched with any one of the second strings.

11. A method to recognize a voice using a plurality of mics, the method comprising:
 determining, in a setup mode, a direction of a first sound received through the plurality of mics;
 setting a non-detecting zone that includes the direction of the first sound;
 determining, in a normal mode, a direction of a second sound received through the plurality of mics; and
 skipping, in the normal mode, voice recognition for the second sound or an operation based on the voice recognition depending on whether the direction of the second sound belongs to the non-detecting zone.

12. The method of claim 11, wherein the skipping includes:
 skipping the voice recognition for the second sound or the operation based on the voice recognition when the direction of the second sound belongs to the non-detecting zone; and
 performing the voice recognition for the second sound and the operation based on the voice recognition when the direction of the second sound is from the non-detecting zone.

13. The method of claim 11, wherein a range of the non-detecting zone has a predetermined angle range.

14. The method of claim 11, further comprising entering the setup mode in response to a user input.

15. The method of claim 11, wherein the setting includes adjusting a range of the non-detecting zone in accordance with a user input transmitted from a user device.

* * * * *